July 22, 1924.

F. SCHULTZ

ELEVATOR

Filed July 15, 1922    10 Sheets-Sheet 1

1,502,273

F. Schultz INVENTOR

ATTORNEY

WITNESS:

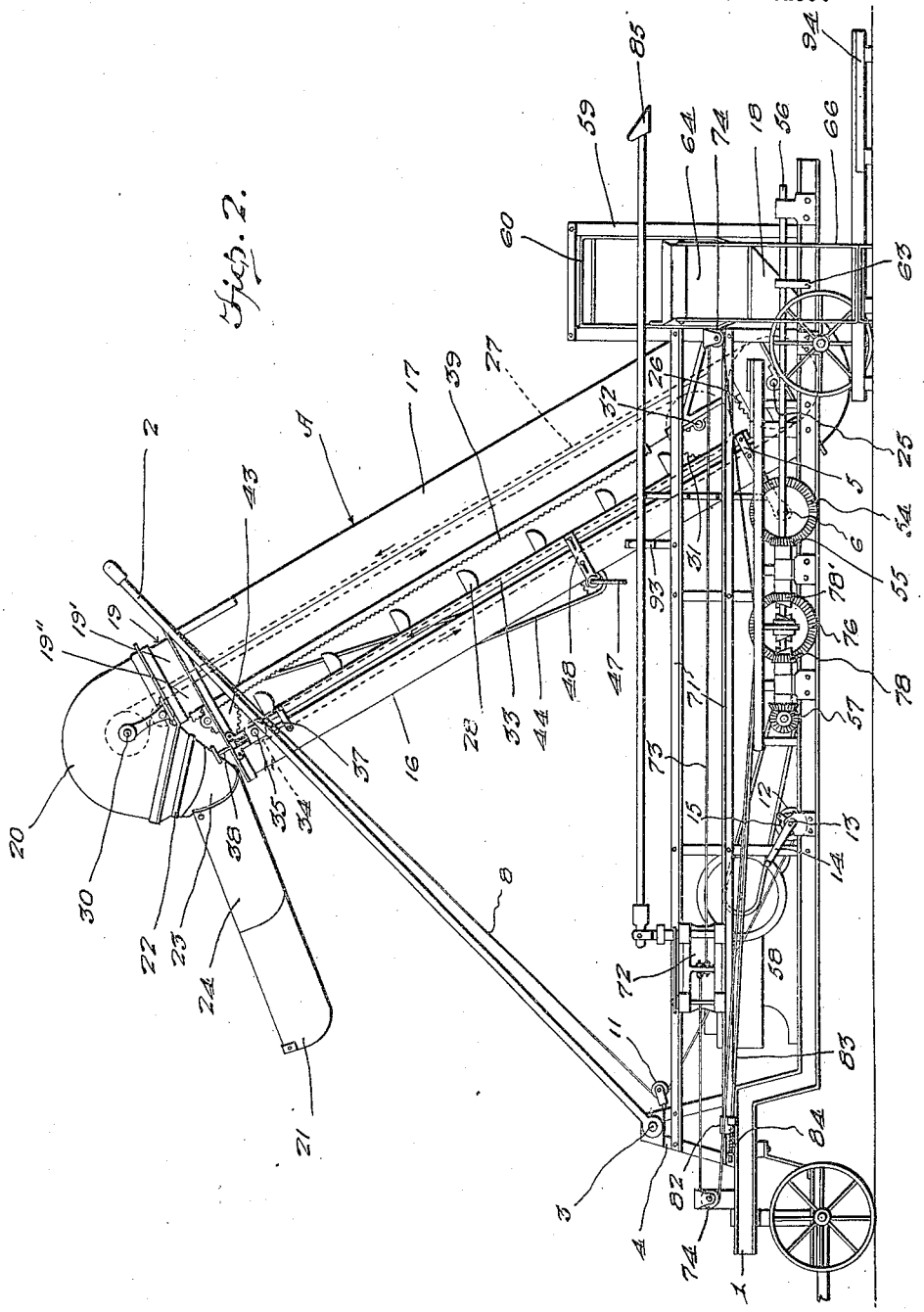

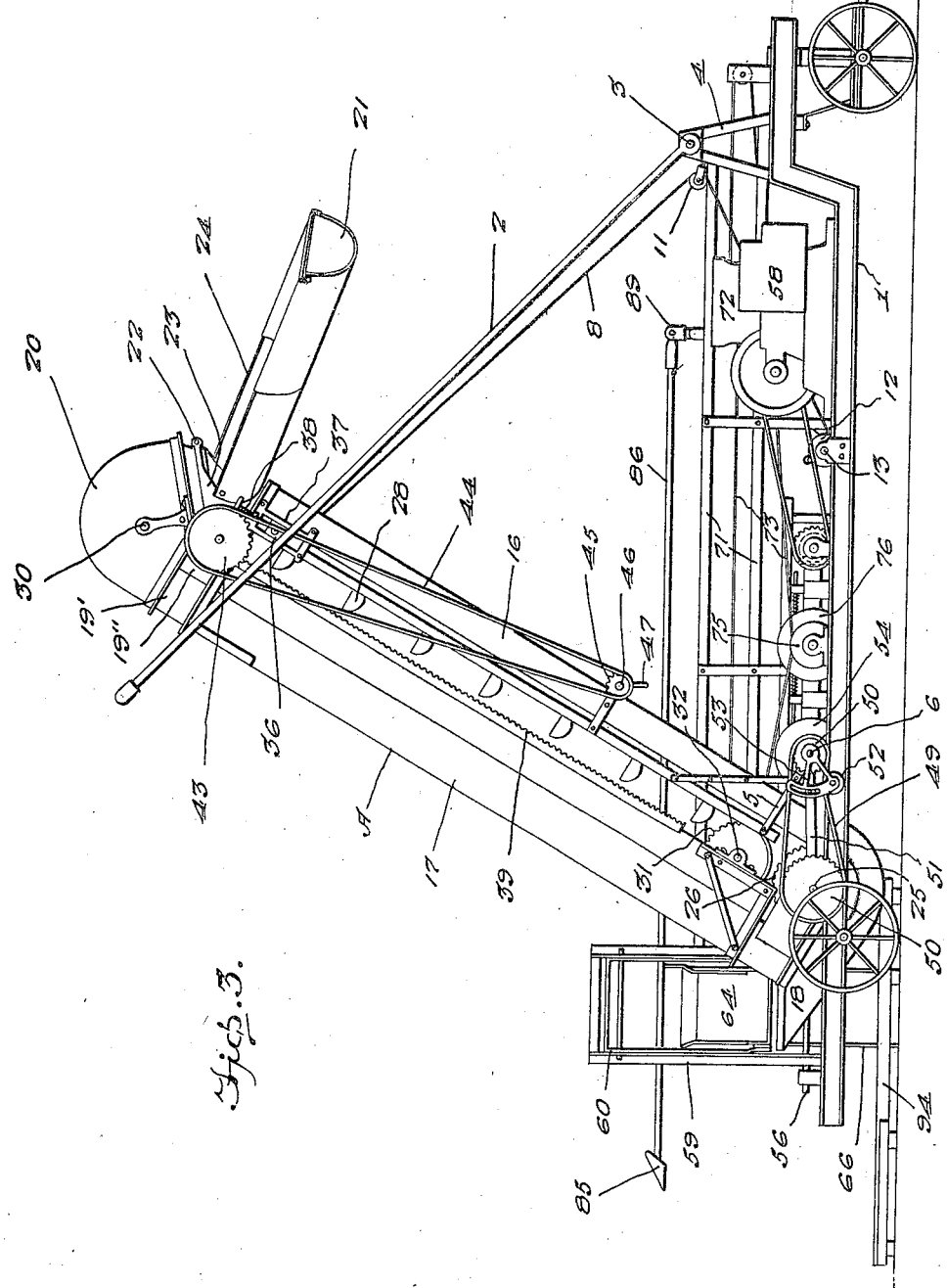

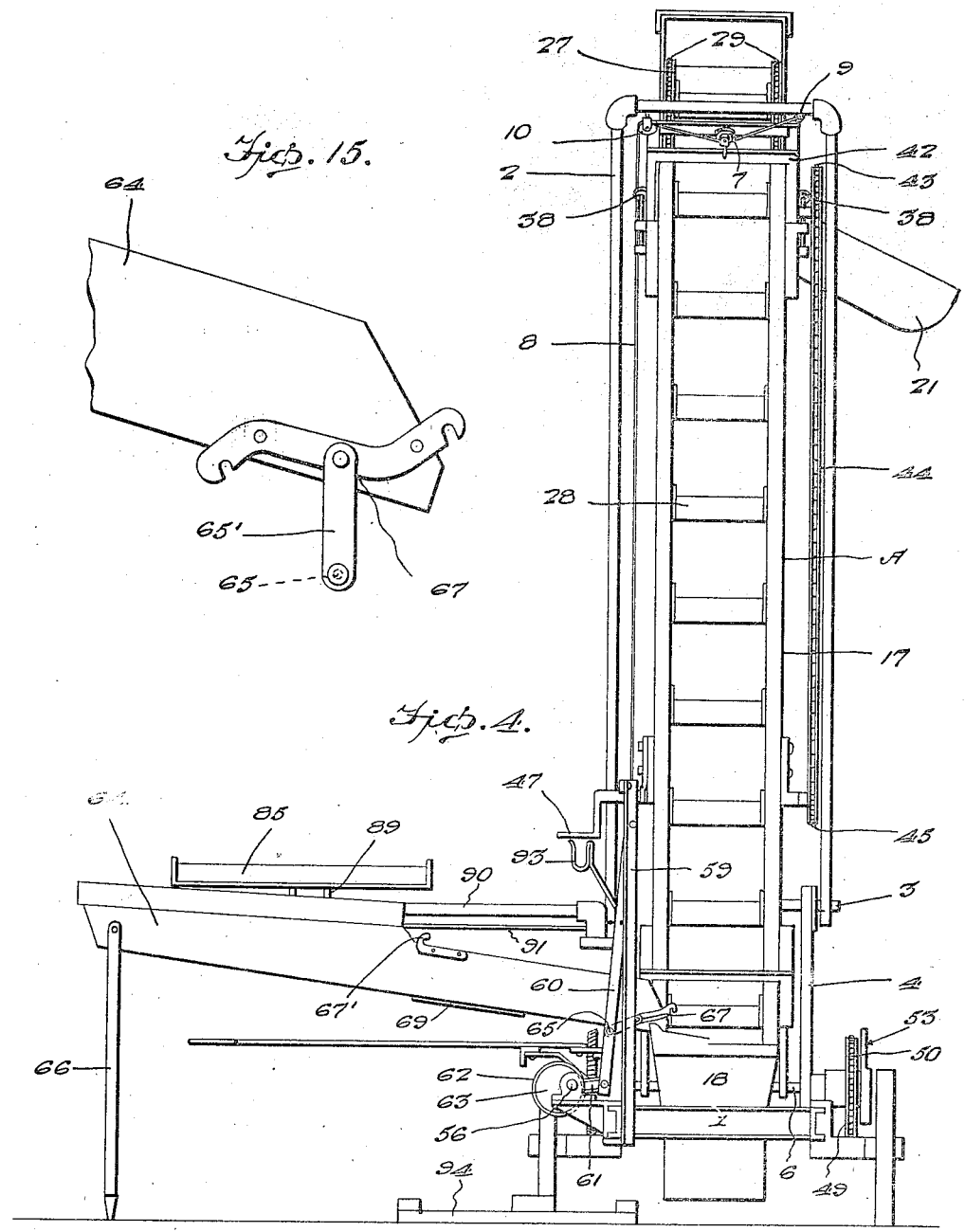

July 22, 1924.
F. SCHULTZ
1,502,273
ELEVATOR
Filed July 15, 1922    10 Sheets-Sheet 5
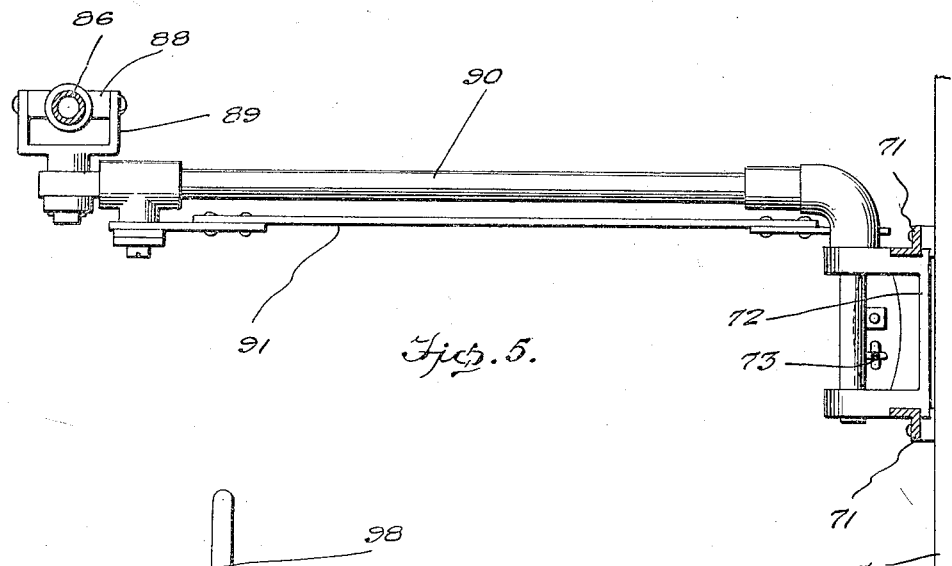
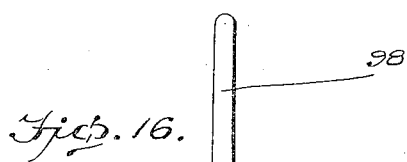
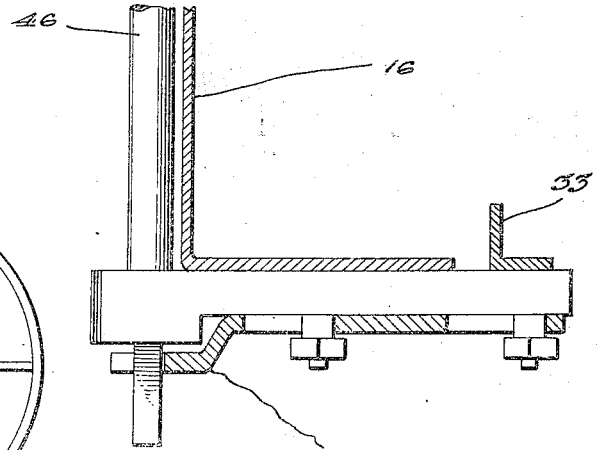
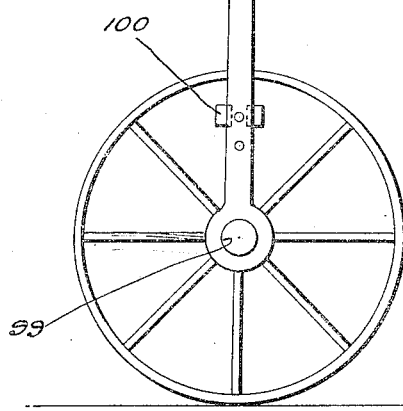
F. Schultz
INVENTOR
BY Victor J. Evans
ATTORNEY
WITNESS:

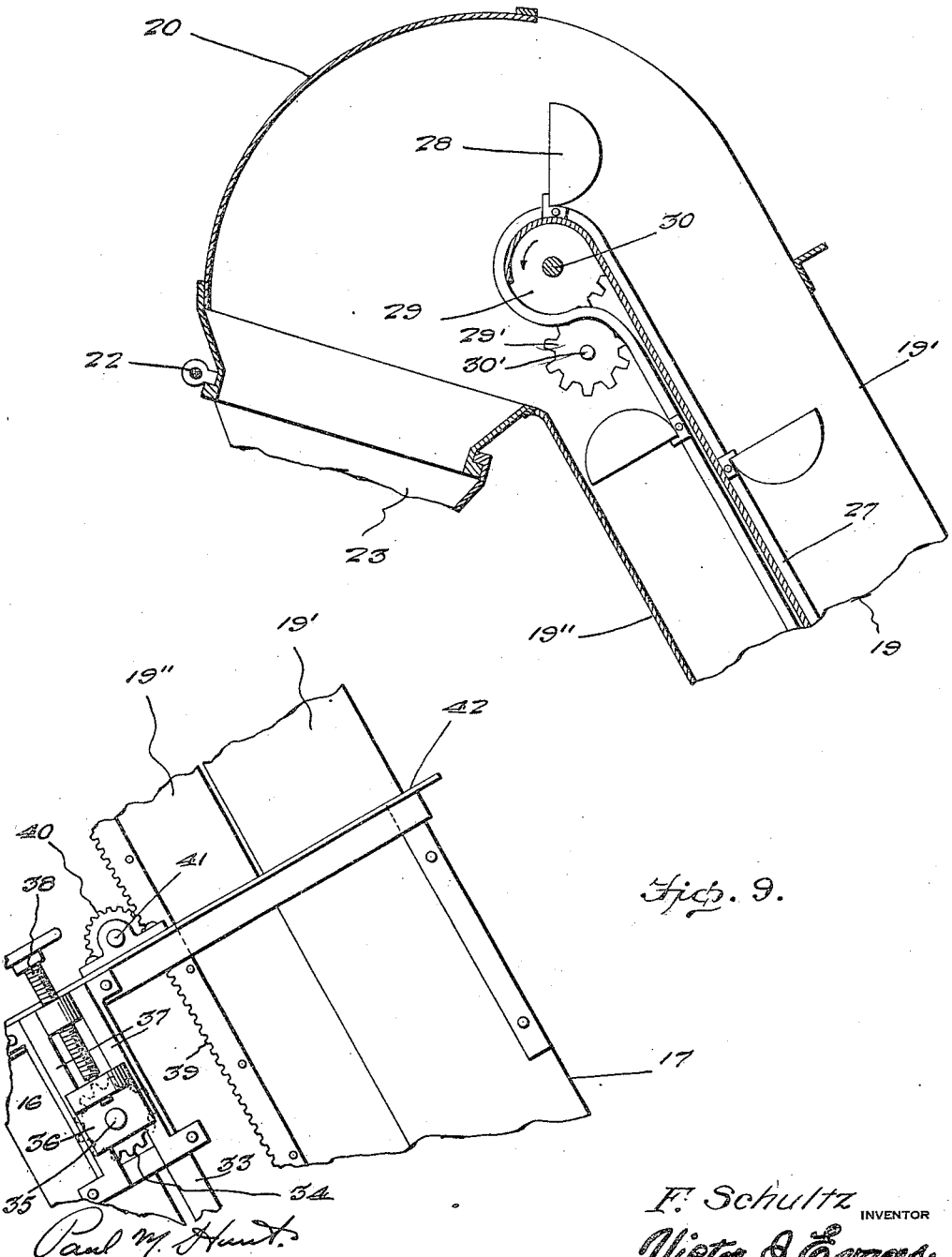

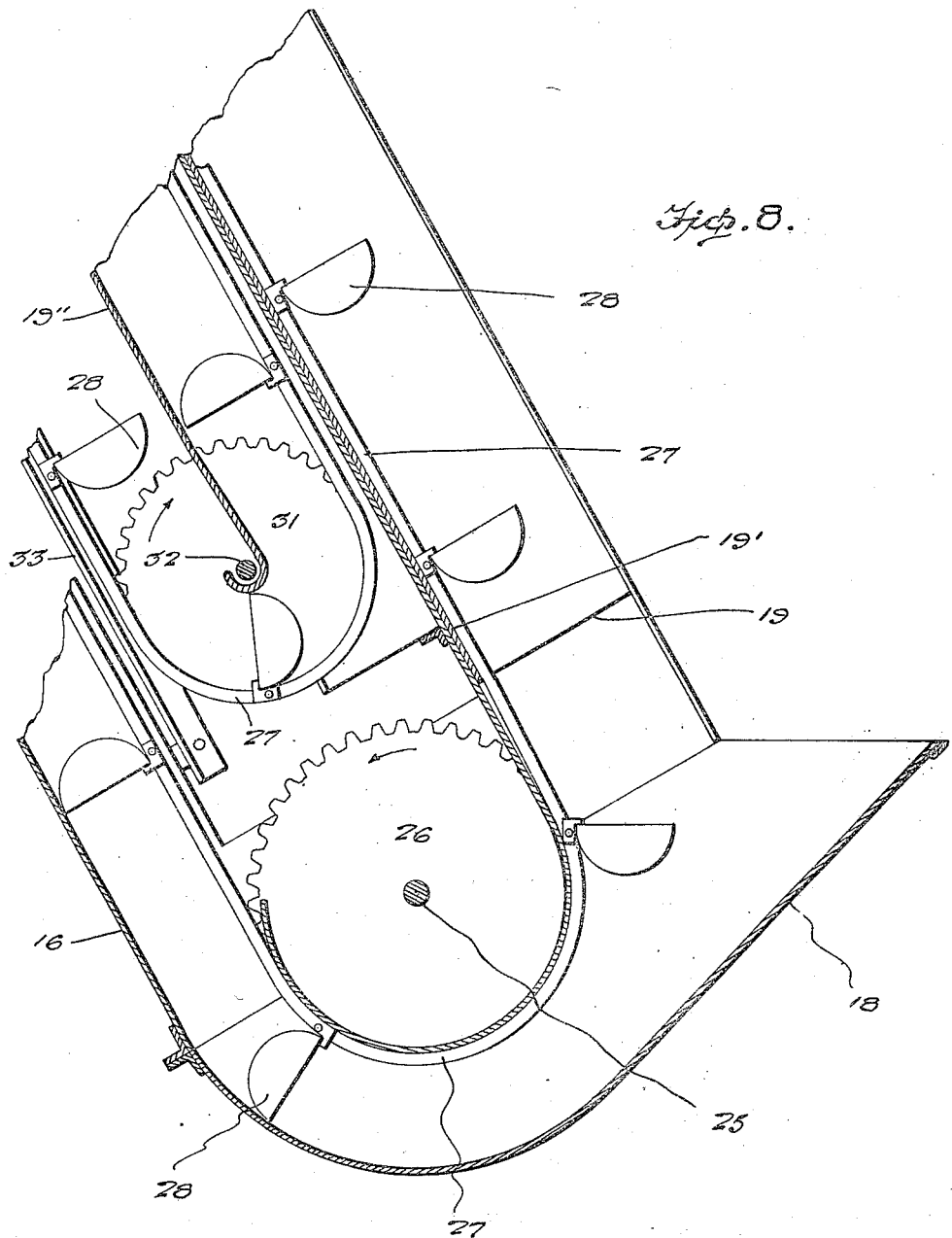

July 22, 1924.  1,502,273
F. SCHULTZ
ELEVATOR
Filed July 15, 1922   10 Sheets-Sheet 9
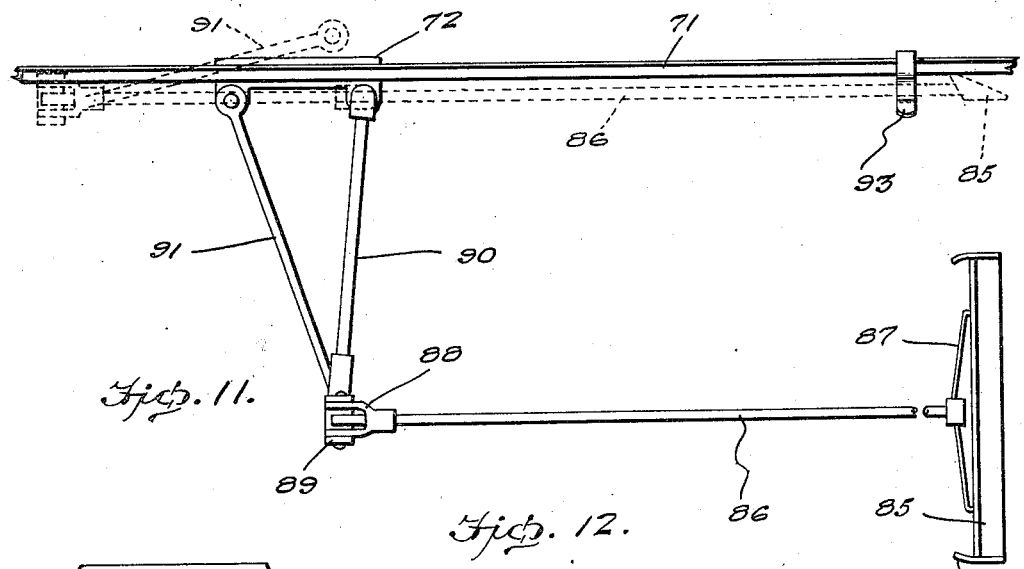
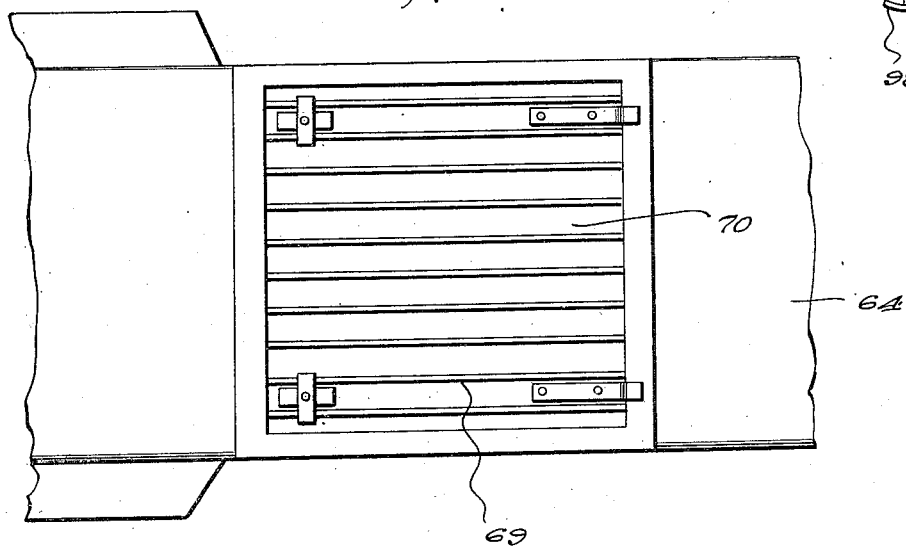
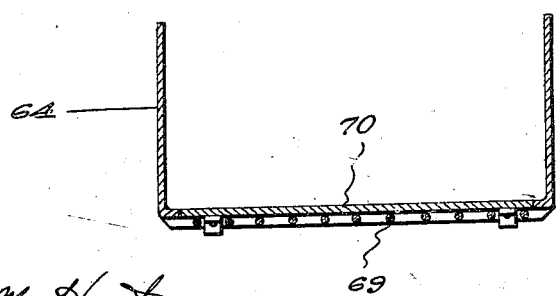
F. Schultz INVENTOR
BY Victor J. Evans ATTORNEY
WITNESS:

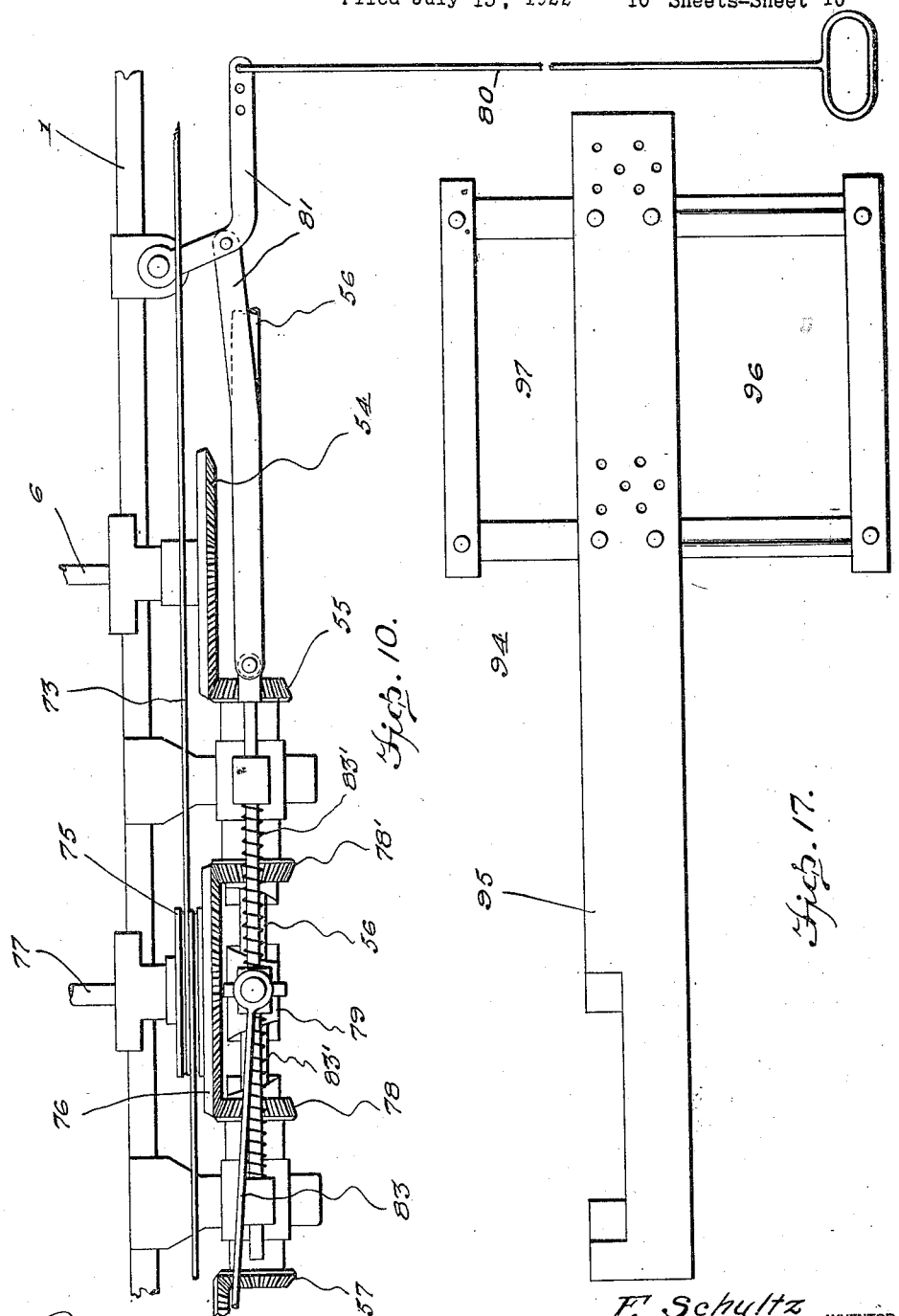

Patented July 22, 1924.

1,502,273

UNITED STATES PATENT OFFICE.

FRED SCHULTZ, OF DECATUR, ILLINOIS.

ELEVATOR.

Application filed July 15, 1922. Serial No. 575,200.

*To all whom it may concern:*

Be it known that I, FRED SCHULTZ, a citizen of the United States, residing at Decatur, in the county of Macon and State of Illinois, have invented new and useful Improvements in Elevators, of which the following is a specification.

This invention relates to an elevator, mainly designed for handling grain and the like, the general object of the invention being to provide means for dragging the grain from a wagon into a chute which is jiggered to cause the grain to pass therefrom into the elevator proper which elevates it to a higher point where it is delivered by a spout into the crib or other receiver.

Another object of the invention is to make the entire device portable so that it can be easily transported from place to place and the parts of which can be so moved that the entire device can be stored in a small space.

Another object of the invention is to make the elevator extensible so that it can be adjusted to fit different heights of cribs.

A still further object of the invention is to provide a mechanically operated device for dragging the grain from the wagon body into a chute.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a plan view of the invention.

Figure 2 is an elevation looking towards one side of the apparatus.

Figure 3 is a similar view looking towards the other side.

Figure 4 is an end view.

Figure 5 is a section on line 5—5 of Figure 1.

Figure 7 is a longitudinal sectional view through the upper portion of the conveyor.

Figure 8 is a similar view through the lower end of the conveyor.

Figure 9 is a detail view illustrating the means for tightening the conveyor belt and the means for adjusting the length of the conveyor housing.

Figure 10 is a detail view of the driving gearing for the scoop and the clutch means associated with such gearing.

Figure 11 is a detail view of the scoop and guide means therefor.

Figure 12 is a detail view showing the grate section of the chute.

Figure 13 is a transverse sectional view of the matter shown in Figure 12.

Figure 14 is a detail view showing the mounting means for one of the shafts.

Figure 15 is a detail view showing the means for connecting the chute with the hopper.

Figure 16 is a view showing means whereby the device may be manually moved a short distance.

Figure 17 is a detail view of the frame used to position a wagon relative to the chute.

Figure 6:
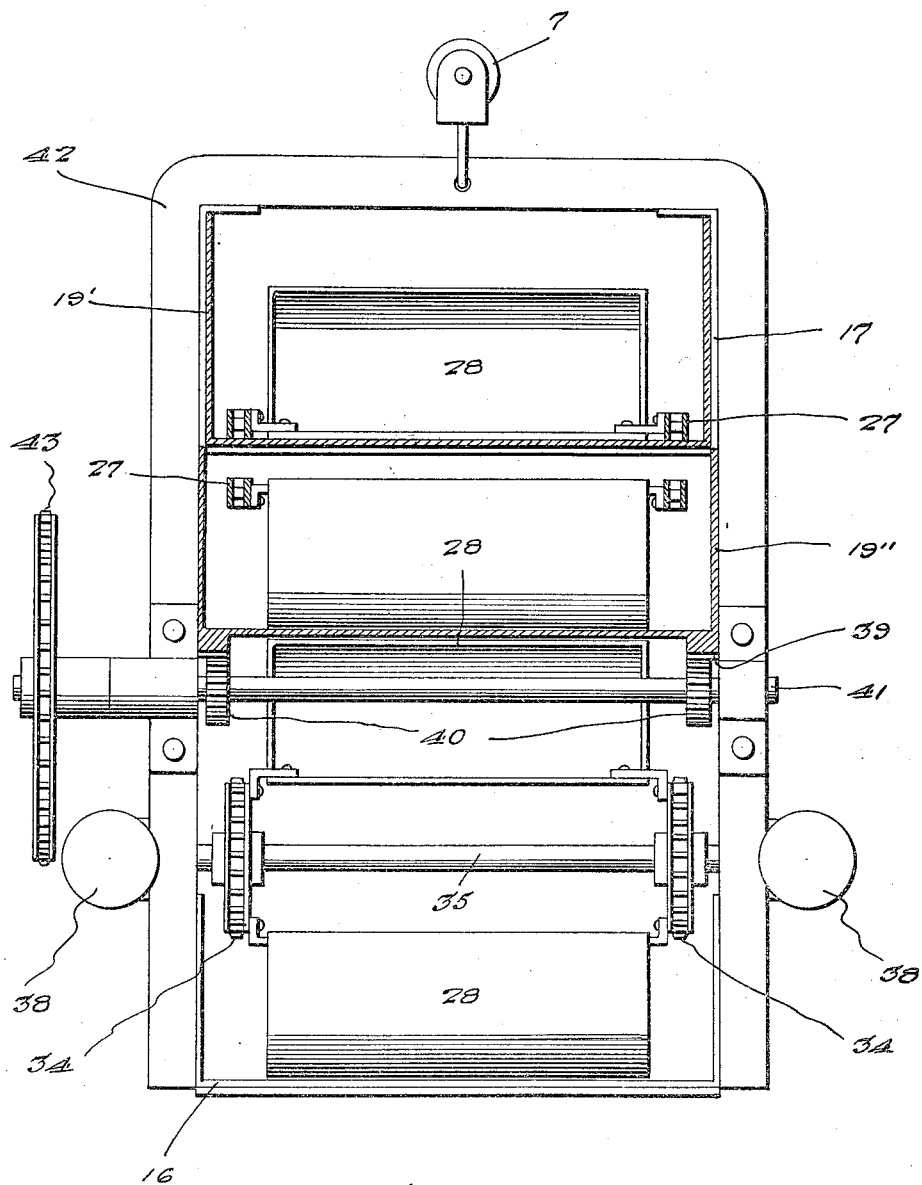
Figure 6 is a transverse sectional view through the upper portion of the conveyor.

In these views 1 indicates a wheeled frame which may be drawn by horses or a tractor. A derrick frame 2, preferably formed of tubing, has its lower end pivotally connected by means of the shaft 3 with the uprights 4, adjacent the front end of the wheeled frame. The elevator A has arms 5 projecting from its lower end and these arms are pivoted on a shaft 6 which is journaled in the wheeled frame an appreciable distance from the rear wheels thereof. This elevator A passes through the derrick frame 2 and its upper part carries a pulley 7 through which a cable 8 passes. Said cable has its end fastened, at 9, to the upper part of the derrick frame and after passing through the pulley 7 it passes through a pulley 10 at the upper end of the derrick frame and then through a pulley 11 on a cross bar which connects the uprights 4 together and from this point the cable passes to a drum 12 mounted on shaft 13 which is journaled in the frame and is provided with a handle 14 so that the drum can be rotated to wind up the cable. The drum is provided with suitable ratchet mechanism 15 for holding the drum with the cable wound thereon.

From the above it will be seen that when the drum is rotated the cable will be shortened and thus the derrick frame and the conveyor will be swung upwardly, as shown in the drawings.

The elevator comprises the lower trough section 16 and the upper trough section 17, which are connected together at the lower ends by the hopper 18. 19 indicates the movable section of the elevator which is formed of the two parts 19' and 19", the part 19' fitting in the top section 17 and part 19" being located below the said section 17. 20 indicates the hood connected with the section 19 and this hood carries the extensible delivery spout 21 which is detachably connected with the hood, as shown at 22. This spout consists of the oval section 23 which is pivotally connected with the first trough section 24 of the spout. This spout may consist of any number of trough sections which slide one in the other, as shown. A shaft 25 is journaled in the hopper part between the upper and lower sections 16 and 17 and this shaft carries the sprockets 26 for the conveyor chains 27 to which the buckets 28 are secured. These chains pass over the sprockets 29 mounted on shaft 30 in the hood and sprockets 29' on stub shafts 30' and then the chains pass downwardly through the part 19" and section 19 and over sprockets 31 carried by a shaft 32, supported adjacent the lower end of said part 19", and then the chains pass upwardly along guideways 33, forming part of the section 16, and over sprockets 34 carried by shaft 35 at the upper end of said section 16 and then the chains pass downwardly through said section 16 through the sprockets 26. As shown in detail in Figure 9, shaft 35 is adjustable by being mounted in blocks 36 which are movable in guideways 37 at the upper end of section 16 and which are connected with the hand screws 38 so that the blocks can be manually adjusted to move the shaft and sprockets to properly tension the conveyor chains.

From the above it will be seen that the movable section 19 of the elevator can be adjusted to make the elevator of the proper length without interfering with the proper working of the conveyor chains and buckets.

The movable section is adapted to be adjusted by hand by means of the racks 39 which are secured to the bottom of the part 19" of the movable section 19 and which are engaged by the pinions 40 which are carried by a shaft 41, journaled in the frame 42 which connects the upper ends of the sections 16 and 17 together and said shaft carries a sprocket 43 which is connected by the chain 44 with a sprocket 45 on a shaft 46, journaled in the lower part of section 16, as shown in detail in Figure 14 and which is adapted to be rotated by means of a crank 47. Suitable means may be provided for holding the shaft 46 against rotation, such means being shown at 48. Thus by rotating the shaft 46, by means of the crank 47, the chains and sprockets will communicate this movement to the shaft 41 so as to rotate the gears 40 and thus move the movable section by means of the racks. The structure just described is detailed in Figures 6 and 9.

Shaft 25 is connected with the shaft 6 by means of an endless chain 49 which passes over sprockets 50 on said shafts and an arm 51 connects the two shafts together and serves to brace them and hold them in proper relative position. An idler 52 for the sprocket chain 49 has its bracket 53 rotatably mounted on shaft 6 and said bracket is adjustably connected with the arm. By this means the rotation of shaft 6 is communicated to the shaft 25 so as to give movement to the conveyor means of the elevator and as the elevator is swung on said shaft 6 this movement will be communicated to the conveyor means in all positions of the elevator.

As shown in detail in Figure 10 the shaft 6 is provided with a bevel gear 54 which meshes with a similar gear 55 located on a shaft 56 journaled at one side of the wheeled frame. This shaft 56 is connected by the gears and shafting 57 with a motor 58 mounted on the wheeled frame. Suitable means are provided for connecting and disconnecting the motor from one of the shafts.

An upright frame 59 is connected with the rear end of the main frame, at one side thereof, and a swinging frame 60 is pivotally mounted in the frame 59 adjacent its upper end. The lower end of the swinging frame is connected by a bar 61 with the strap 62 of an eccentric 63 which is mounted on shaft 56 so that the frame 60 will be rocked when shaft 56 is rotated by the motor. A chute 64 is adjustably and pivotally secured to the swinging frame 60 by means of the cross bar 65 and the links 65'. The outer end of the chute is supported by the swinging legs 66 and double hooks 67 are placed at the inner end of the chute for engaging the bar 65. Hooks 67' as detailed in Figure 15 are placed on the chute intermediate the ends thereof for engaging the cross bar of the frame 59 to hold the chute in perfect position alongside the frame 59 when the said chute is not being used. When the chute is in vertical position the outer ends of the hooks 67 will engage the bar 65 and when the chute is in horizontal position the inner ends of these hooks 67 will engage said bar, as shown in Figure 4. It will be seen that the swinging movement of the frame 60 by the eccentric will give a jigging action to the chute so that the grain therein will be caused to flow into the hopper of the elevator. The outer end of the chute can be raised to permit a wagon to pass under the same. As best shown in Figures 12 and 13 I prefer to place a grate section 69 in the bottom of the chute which may be covered by a plate 70 which is suitably secured in place. This grate will permit shelled corn to drop from the chute and not pass into the elevator when ear corn is being handled. When other grain is being handled the plate can be put in place so as to cover the grate section.

A track 71 detailed in Figure 11 is arranged at one side of the main frame and a slide 72 engages said track. The ends of a cable 73 are secured to the slide and said cable passes over pulleys 74 at the ends of the track and has its center part wrapped around a grooved drum 75 which as illustrated in detail in Figure 10 forms part of a beveled wheel 76 which is secured to a shaft 77 journaled in the main frame. Thus the rotation of the shaft and wheel will cause the cable to pull the slide towards one end of the track or the other according to the direction of rotation of the wheel. This wheel is in mesh with a pair of small gears 78 and 78′ which are loosely mounted on the shaft 56 and engage the wheel 76 at opposite sides. A clutch 79 is arranged on the shaft 56 for engaging clutch parts on the gears 78 and 78′, these clutch parts being so arranged that when the gear 78 is connected with the shaft 56 by the clutch parts the wheel 76 and its drum will be rotated in one direction and when the gear 78′ is connected with the shaft by the clutch parts, said wheel and drum will be rotated in an opposite direction. Thus the slide can be moved in either direction by moving the clutch 79. This clutch 79 can be moved by means of the lever 80 and the links 81, and the clutch is automatically thrown out of engagement with the gear 78′ when the slide reaches the front end of the track by means of the movable stop 82 on the track and adapted to be struck by the slide and which is flexibly connected with the clutch by means of the rod 83 and its spring 84. Springs 83′ are provided for holding the clutch in neutral or disengaged position until the operator actuates the lever to move the clutch into one or the other of its positions.

As detailed in Figures 5 and 11 the slide is adapted to operate wagon unloading means which consists of the inclined scoop member 85 which is placed in the wagon box and which is rockingly connected to the bar 86 by means of the arms 87, said bar being connected by a fork 88 to a second fork 89 which is rotatably mounted in the end of an arm 90 which is rotatably and detachably connected with the slide. The two forks are pivotally connected together so that the bar 86 can be swung in a vertical plane. A brace 91 is pivotally connected with the outer end of the arm 90 and has an eye for engaging a projection 92 on the slide. By removing the eye of brace 91 from said projection the parts can be moved into the position shown in dotted lines in Figure 11 of the drawings and the bar 86 placed in the hook support 93 which is located on the upper rail of the track.

I also provide a frame 94 as shown in Figure 17 for holding the wagon to be unloaded in a certain relation to the apparatus, such frame having an extension 95 which is slotted to engage the rear wheel of the apparatus and the frame is also provided with a space 96 for receiving the left rear wheel of the wagon and another space 97 for receiving sacks of sand or the like for holding the frame against movement. When the wagon is placed with its left rear wheel in the space 96 its box will be in proper position for the scoop to operate therein to draw the grain therefrom into the chute 64. Said scoop is provided with end pieces 98′ which prevent the scoop from tearing out the cleats at the ends of the wagon box.

I may also provide a lever 98 as best shown in Figure 16 which is provided with an opening 99 for engaging one of the wheel hubs of the device and which is also provided with a part 100 for engaging one of the spokes of the wheel to move the apparatus a short distance without the use of horses or a tractor.

From the above it will be seen that the parts can be placed in such a position that they will occupy the minimum amount of space upon the wheeled frame when not in use so that the same can be transported from place to place and stored away.

When in use the wagon with the grain therein is driven upon the frame 94, the chute being raised to permit the wagon to pass under it. The scoop 85 is then placed in the wagon box and the engine is coupled to the shaft 56. The clutch 79 is then manipulated to cause the slide to reciprocate upon its track and thus move the scoop in the wagon box to draw the grain therefrom into the chute. The movement of this chute by the eccentric will cause the grain to flow down the same into the hopper of the elevator where the buckets will carry it up the elevator into the hood and from the hood the grain will pass through the chute 21 which will discharge it into the crib or other receiver.

By my extensible elevator the grain can be discharged from the upper chute within a short distance of the floor of the crib so that it will not scatter it and then as the pile increases the elevator may be adjusted upwardly so that the entire crib may be filled. This is especially useful in handling corn.

It will of course be understood that my invention can be used for handling other material besides grain and it can be used for filling freight cars and the like as well as cribs.

By use of a manually operated scoop it is not necessary to jack the wagon up on shoveling the grain from the wagon.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. An apparatus of the class described comprising a wheeled frame, an elevator mounted therein, a chute for delivering the material into the lower end of the elevator, a reciprocating member for dragging the material from a wagon body into the chute, and means for agitating the material in the chute.

2. An apparatus of the class described comprising a wheeled frame, an elevator carried thereby, a vertically arranged frame, a second frame hingedly connected to the first frame at its upper end, means for swinging the second frame around its pivot and a chute connected with the swinging frame.

3. An apparatus of the class described comprising a wheeled frame, an elevator carried thereby, a vertically arranged frame, a second frame hingedly connected to the first frame at its upper end, means for swinging the second frame around its pivot, a chute connected with the swinging frame and hinged legs for the outer end of the chute.

4. An apparatus of the class described comprising a wheeled frame, an elevator thereon, a chute connected with the main frame for feeding the material to the elevator, a slide mounted for longitudinal movement along the main frame, clutch controlled means for reciprocating the slide, an arm rotatably connected with the slide, a brace for holding the arm in extended position, a bar movably connected with the outer end of the arm and a scoop connected with the outer end of the bar.

5. An apparatus of the class described comprising a wheeled frame, an elevator thereon, a chute connected with the main frame for feeding the material to the elevator, a slide mounted for longitudinal movement along the main frame, clutch controlled means for reciprocating the slide, an arm rotatably connected with the slide, a brace for holding the arm in extended position, a bar movably connected with the outer end of the arm, a scoop connected with the outer end of the bar and means for supporting the bar alongside the track when the brace is in inoperative position.

6. An apparatus of the class described comprising a wheeled frame, a motor thereon, a longitudinally extending shaft at one side of the frame, means for connecting the same with the motor, a shaft mounted in the main frame and geared to the first mentioned shaft, a conveyor having a part of its frame pivotally connected with said second shaft, conveyor means in the elevator, means for transmitting the movement of the second shaft to the conveyor means, a chute, a rocking frame to which the chute is pivotally connected, an eccentric on the longitudinally extending shaft connected with the rocking frame, a slide movable longitudinally of the main frame, a drum, connections from the same with the slide for moving the slide, clutch means for connecting the drum with the longitudinally extending shaft so that the drum can be rotated in either direction and wagon unloading means connected with the slide.

7. An apparatus of the class described comprising a wheeled frame, an elevator carried thereby, a chute having one end connected with the wheeled frame, legs for supporting the outer end of the chute, a frame for engaging one of the wheels of the main frame and having a space for receiving one of the wheels of the wagon to be unloaded so as to position said wagon with the end of its box over the chute.

8. An apparatus of the class described comprising a wheeled frame, an elevator supported thereby, means for adjusting the height of the elevator, a chute for feeding the material into the lower end of the elevator, means for holding the chute in vertical position at one side of the frame, wagon unloading means on the main frame for drawing the grain from the wagon into the chute and means for holding such means when in inoperative position at one side of the main frame.

In testimony whereof I affix my signature.

FRED SCHULTZ.